US012323667B2

(12) United States Patent
Singh et al.

(10) Patent No.: US 12,323,667 B2
(45) Date of Patent: Jun. 3, 2025

(54) SYSTEM, METHOD, AND COMPUTER-READABLE RECORDING MEDIUM OF DETECTING WIRELESS HOME DIGITAL INTERFACE DEVICES AND CONFIGURING PARENTAL CONTROL FOR EACH

(71) Applicant: ARRIS Enterprises LLC, Suwanee, GA (US)

(72) Inventors: Virendra Singh, Bangalore (IN); Vinod Jatti, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/155,794

(22) Filed: Jan. 22, 2021

(65) Prior Publication Data

US 2021/0235162 A1   Jul. 29, 2021

Related U.S. Application Data

(60) Provisional application No. 62/965,448, filed on Jan. 24, 2020.

(51) Int. Cl.
*H04N 21/475* (2011.01)
*H04N 21/426* (2011.01)
*H04N 21/454* (2011.01)

(52) U.S. Cl.
CPC ... *H04N 21/4751* (2013.01); *H04N 21/42684* (2013.01); *H04N 21/454* (2013.01); *H04N 21/4753* (2013.01)

(58) Field of Classification Search
CPC ......... H04N 21/4751; H04N 21/42684; H04N 21/454; H04N 21/4753; H04N 21/43615; H04N 21/20–80
See application file for complete search history.

(56) References Cited

U.S. PATENT DOCUMENTS 8,046,801 B2 * 10/2011 Ellis ................... H04N 21/4821
  725/38
8,079,044 B1 * 12/2011 Craner ............... H04N 21/4826
  725/28

(Continued)

OTHER PUBLICATIONS

Office Action issued Jun. 16, 2023 in Canadian Patent Application No. 3,106,792.

(Continued)

*Primary Examiner* — Mushfikh I Alam
(74) *Attorney, Agent, or Firm* — Wenderoth, Lind & Ponack, L.L.P.

(57) ABSTRACT

A system, method, and computer-readable recording media implementing detection of wireless home digital interface (WHDI) devices and the configuration of parental control for each. Authenticating through a set-top box (STB) at least one end device (ED), being a WHDI device, on a wireless network. The STB includes a database that provides access codes/set of pins for each ED that is added to the wireless network. When an identification of an ED is already in the database of the STB, and parental control is part of a content access request, a MAC address of the ED is authenticated and an access code/set of pins is obtained. The content access request is processed when the access code/set of pins obtained matches the access code/set of pins that is configured in the database of the STB.

17 Claims, 6 Drawing Sheets

(56) References Cited

U.S. PATENT DOCUMENTS

| | | | | |
|---|---|---|---|---|
| 8,683,527 B2* | 3/2014 | Pratt | ............... | H04N 21/43615 |
| | | | | 725/62 |
| 8,806,530 B1* | 8/2014 | Izdepski | ............ | H04N 21/4126 |
| | | | | 725/141 |
| 2003/0212820 A1* | 11/2003 | deCarmo | ......... | H04N 21/42684 |
| | | | | 709/227 |
| 2004/0203374 A1* | 10/2004 | Zilliacus | ............ | H04N 21/4882 |
| | | | | 348/E5.002 |
| 2007/0157281 A1* | 7/2007 | Ellis | .................. | H04N 21/4147 |
| | | | | 725/74 |
| 2008/0148310 A1* | 6/2008 | Strickland | ............ | H04N 21/441 |
| | | | | 725/30 |
| 2008/0281926 A1* | 11/2008 | Walter | ................... | H04N 7/163 |
| | | | | 709/206 |
| 2010/0192183 A1* | 7/2010 | Hu | ..................... | H04N 21/4135 |
| | | | | 725/62 |
| 2010/0235867 A1* | 9/2010 | Zhao | .................. | H04N 21/4334 |
| | | | | 725/78 |
| 2010/0319037 A1* | 12/2010 | Kim | ................. | H04N 21/44227 |
| | | | | 725/81 |
| 2010/0333128 A1* | 12/2010 | Smith | .............. | H04N 21/44224 |
| | | | | 726/4 |
| 2011/0320963 A1* | 12/2011 | Wong | ................... | H04N 21/631 |
| | | | | 715/755 |
| 2012/0054806 A1* | 3/2012 | Reznic | ............. | H04N 21/64784 |
| | | | | 725/81 |
| 2012/0324504 A1* | 12/2012 | Archer | ............... | H04N 21/2743 |
| | | | | 725/30 |
| 2013/0194510 A1* | 8/2013 | Freundlich | ....... | H04N 21/43637 |
| | | | | 348/723 |
| 2014/0146785 A1* | 5/2014 | Cavgalar | ................ | H04W 88/16 |
| | | | | 370/352 |
| 2014/0330951 A1* | 11/2014 | Sukoff | .................... | H04L 47/70 |
| | | | | 709/223 |
| 2016/0007074 A1* | 1/2016 | Marsh | .................... | H04N 5/782 |
| | | | | 386/299 |
| 2016/0142776 A1* | 5/2016 | Meijer | ............. | H04N 21/25883 |
| | | | | 725/28 |
| 2016/0191872 A1* | 6/2016 | Wang | ................. | H04N 21/4854 |
| | | | | 348/744 |
| 2016/0309203 A1* | 10/2016 | Gonzalez | ................ | H04L 69/16 |
| 2018/0063263 A1* | 3/2018 | Bandela | ........... | H04N 21/44224 |
| 2018/0219856 A1* | 8/2018 | Mushikabe | ...... | H04N 21/43615 |
| 2019/0207948 A1* | 7/2019 | Mallis | ..................... | H04L 63/02 |
| 2021/0083926 A1* | 3/2021 | Costa | ..................... | G06N 20/10 |
| 2024/0129257 A1* | 4/2024 | Sukoff | ................ | H04L 12/2818 |

OTHER PUBLICATIONS

Office Action issued May 3, 2024 in corresponding Canadian Patent Application No. 3,106,792.

Office Action dated Feb. 6, 2025 issued in Canadian Application No. 3,106,792.

* cited by examiner

FIG. 2

SYSTEM, METHOD, AND COMPUTER-READABLE RECORDING MEDIUM OF DETECTING WIRELESS HOME DIGITAL INTERFACE DEVICES AND CONFIGURING PARENTAL CONTROL FOR EACH

TECHNICAL FIELD

The subject matter of the present disclosure relates generally to detecting wireless home digital interface (WHDI) devices and configuring parental control for each.

BACKGROUND

Set-top boxes (STB) are provided with high definition Multimedia Interfaces (HDMI) to securely deliver the content to a physically connected end device (ED). This connection between the STB and the ED is through an HDMI cable. Currently, these connections can be limiting as to accessibility and availability of multiple EDs. These EDs are typically used throughout a building or location. Therefore, issues occur when a user desires to restrict access to a broadcast or the like for specific EDs. There is no practical way to ensure a single STB serves multiple videos on multiple EDs simultaneously with the same or different content.

Thus, it would be advantageous and an improvement over the relevant technology to provide a system and/or a method that is capable of providing detection of wireless home digital interface devices and to configure parental control for a plurality of EDs from a single STB simultaneously with the same or different content.

SUMMARY

Embodiments described in the present disclosure provide methods to detect wireless home digital interface (WHDI) devices. The methods include receiving a content access request in a set-top box (STB) for streaming content, the content access request being from an end device (ED) through a wireless high definition multimedia interface connection. Verifying an ED identification of the ED is established and stored within a database of the STB. It is then determined if the content access request from the ED, with the ED identification, includes parental control restrictions controlled through the STB, when the ED identification is successfully verified.

A media access control (MAC) address of the ED is mapped to the database within the STB when parental control restrictions are indicated. An access code/set of pins associated with the ED is obtained when it is determined parental control restrictions disallow the content access request for the MAC address identified. The access code/set of pins is matched to an access code/set of pins associated with the MAC address stored for the ED identification in the database.

The methods further include processing the content access request with a positive determination that the access code/set of pins obtained is the same access code/set of pins that is configured in the database of the STB for the ED identification. The content is provided corresponding to the processed content access request.

Embodiments described in the present disclosure provide a non-transitory computer-readable recording medium in each of a set-top box (STB) and ED for detecting wireless home digital interface (WHDI) devices and configuring parental control for each, each non-transitory computer-readable recording medium storing one or more programs which when executed by a respective processor performs a method comprising: receiving a content access request in a set-top box (STB) for streaming content, the content access request being from an end device (ED) through a wireless high definition multimedia interface connection; verifying an ED identification of the ED is established within a database of the STB; determining if the content access request from the ED, with the ED identification, includes parental control restrictions controlled through the STB, when successfully verified.

The method, performed by the respective non-transitory computer-readable recording medium, further includes mapping a media access control (MAC) address of the ED to the database within the STB, when parental control restrictions are indicated; obtaining an access code/set of pins, when it is determined parental control restrictions are indicated, and matching the access code/set of pins to an access code/set of pins associated with the MAC address stored for the ED identification in the database; and processing the content access request with a positive determination that the access code/pin obtained is the same access code/pin that is configured in the database of the STB for the ED identification.

Embodiments described in the present disclosure provide systems for detecting wireless home digital interface (WHDI) devices and configuring parental control for each device. The systems include a set-top box (STB) and at least one end device (ED), with the STB and the at least one ED being configured to communicate and receive messages and transmit requests using a network connection. The ED is configured to transmit a content access request message to the STB after joining the network.

The systems further include the STB configured to determine if an ED identification is established and if the ED identification includes parental control restrictions, based on content in a database within the STB. The STB is configured to obtain an access code/set of pins, based on mapping of a media access control (MAC) address of the ED, and to process the content access request with a positive determination that the access code/set of pins obtained is the same access code/set of pins that is configured in the database of the STB. The STB then provides content corresponding to the processed request.

BRIEF DESCRIPTION OF THE DRAWINGS

In the drawings, like reference numbers generally indicate identical, functionally similar, and/or structurally similar elements.

FIG. 2 illustrates an exemplary embodiment of a parental control configuration according to the present disclosure;

DETAILED DESCRIPTION

Figure 1:
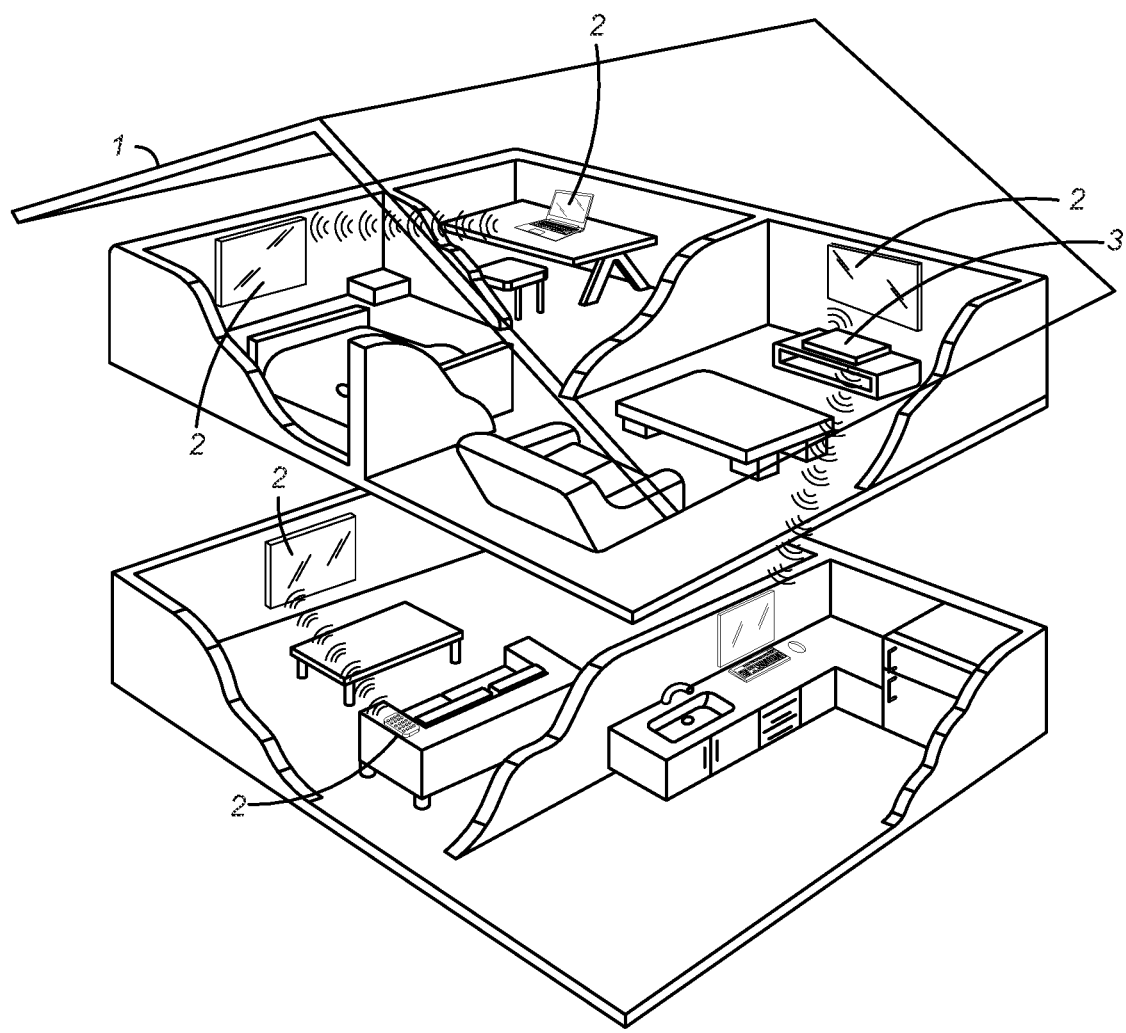
FIG. 1 is an illustration of a system for detecting wireless home digital interface devices and configuring parental control for each according to the present disclosure.

FIG. 1 is an illustration of a system for detecting wireless home digital interface (WHDI) devices and configuring parental control for each of the WHDI devices. As shown in FIG. 1, the system includes a location site 1; at least one end device (ED) 2; and a set-top box (STB) 3. When referring to one specific ED or location within the following description below, only one of the particular component may be listed as an example of how all may operate. When describing how multiple of each component operates together, several of the component may be called out by number (i.e. #1, #2).

Figure 7:
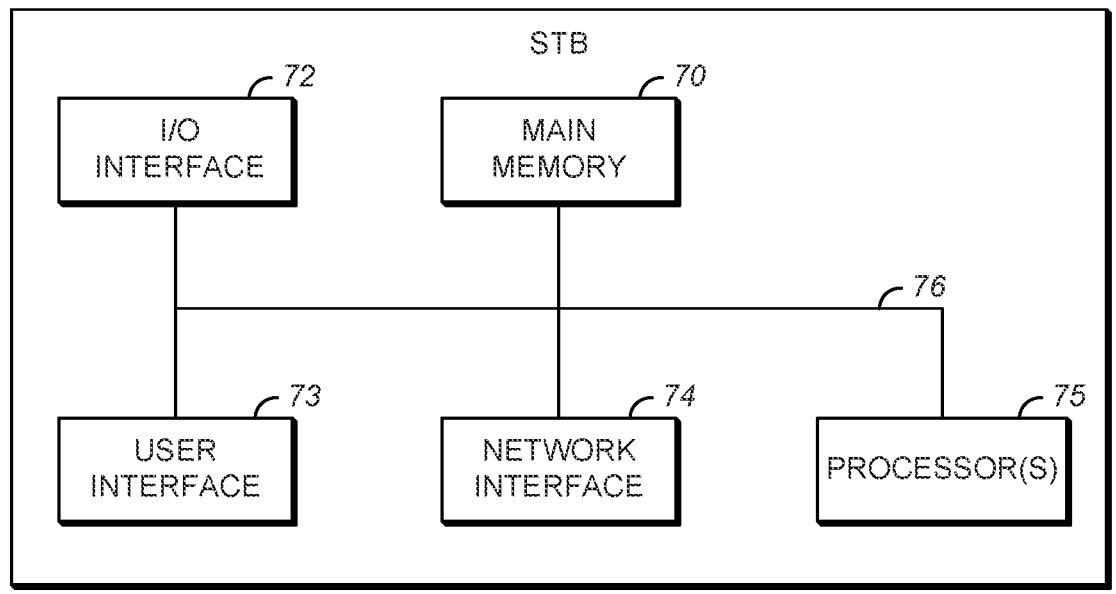
FIG. 7 is a schematic diagram of an exemplary set-top box according to an embodiment of the present disclosure.
Figure 8:
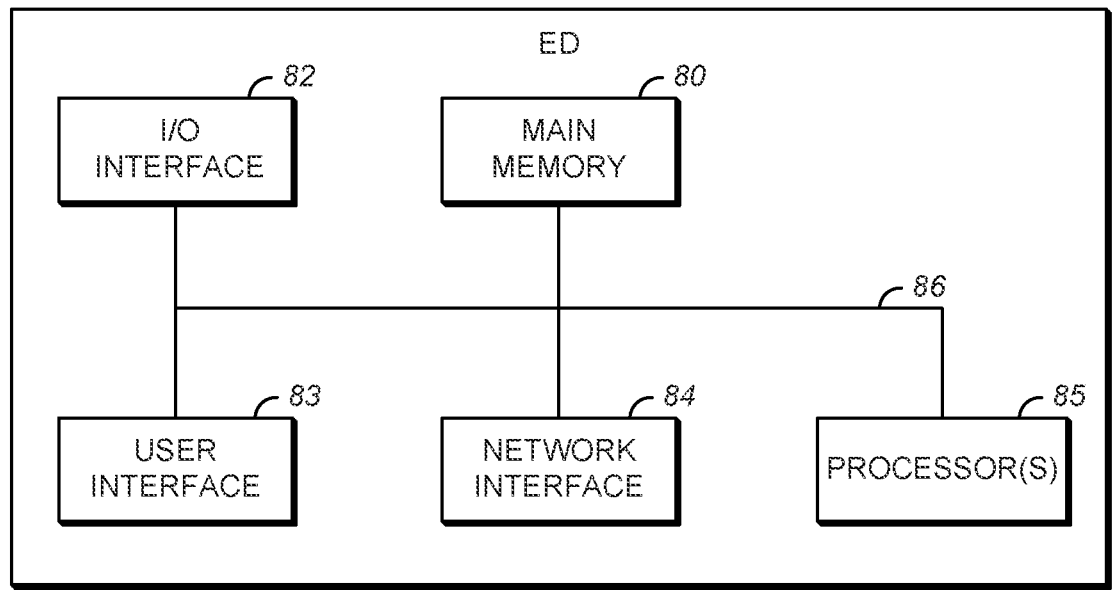
FIG. 8 is a schematic diagram of an exemplary end device according to an embodiment of the present disclosure.

An explanation of exemplary internal components of the STB 3 and EDs 2 shown in FIG. 1 will be provided in the discussion of FIGS. 7 and 8. However, in general, it is contemplated by the present disclosure that the STB 3 and EDs 2 include electronic components or electronic computing devices operable to receive, transmit, process, store, and/or manage data and information associated with the system, which encompasses any suitable processing device adapted to perform computing tasks consistent with the execution of computer-readable instructions stored in a memory or a computer-readable recording medium.

Further, any, all, or some of the computing devices in the STB 3 and EDs 2 may be adapted to execute any operating system, including Linux, UNIX, Windows Server, etc., as well as virtual machines adapted to virtualize execution of a particular operating system, including customized and proprietary operating systems, as well as virtual containers including Docker and LXC (linux containers). The STB 3 and EDs 2 are further equipped with components to facilitate communication with other computing devices over one or more wireless network connections 8,9. The network connections 8,9 include connections to local and wide area networks, wireless networks, public and private networks, and any other communication network enabling communication in the system.

Figure 6:
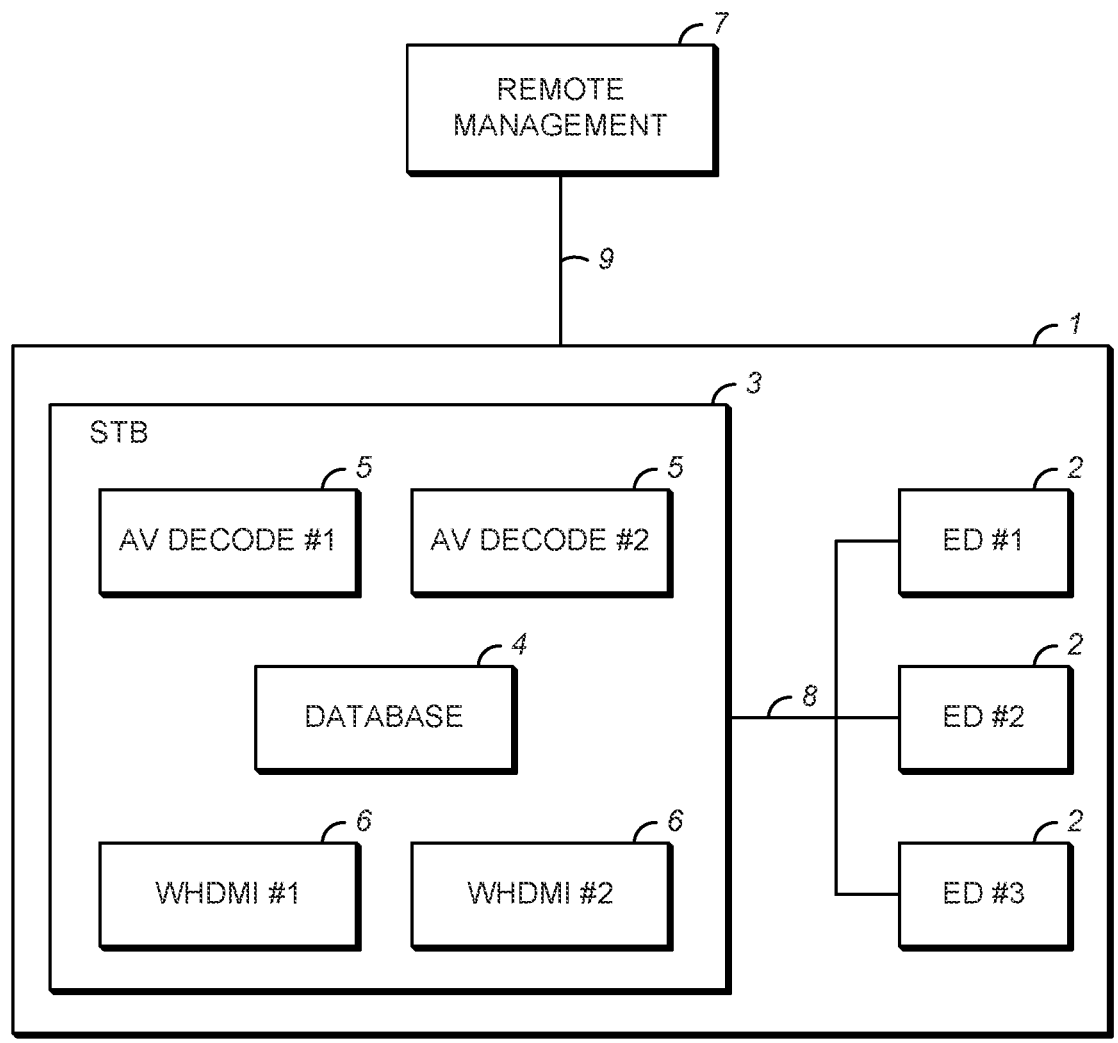
FIG. 6 is a schematic diagram of the system for detecting wireless home digital interface devices and configuring parental control for each according to an embodiment of the present disclosure.

In FIG. 1 and in FIG. 6, the EDs 2 are a personal computer, laptop, smartphone, tablet computer, personal digital assistant, in-vehicle computing systems, or other similar computing device. The EDs 2 include one or more memories or memory locations for storing the software components. The one or more memories in the ED 2 include, but are not limited to, random access memory (RAM), dynamic random access memory (DRAM), read only memory (ROM), logic blocks of a field programmable gate array (FPGA), erasable programmable read only memory (EPROM), and electrically erasable programmable ROM (EEPROM).

The EDs 2 can include a user interface such as a keyboard, mouse, touchscreen display, network connection between user and STB 3, or the like to allow a user to view and interact with the applications, tools, services, and other software of the EDs 2. The present disclosure contemplates that more than one ED 2 can be a part of the system as is shown in FIG. 1 and in FIG. 6.

In FIG. 6, the STB 3 is a gateway that includes multiple audio/video decoders 5, a database 4 that has one or more memories or memory locations that stores instructions, and a plurality of wireless high definition multimedia interfaces (WHDMI) 6. The one or more memories in the STB 3 include, but are not limited to, random access memory (RAM), dynamic random access memory (DRAM), read only memory (ROM), logic blocks of a field programmable gate array (FPGA), erasable programmable read only memory (EPROM), and electrically erasable programmable ROM (EEPROM). The STB 3 is capable of persistently storing information with respect to EDs 2 connected to the STB 3, such as a media access control (MAC) address of each ED 2, an ED identification for each ED 2, and access codes/set of pins. Additionally, FIG. 6 shows a remote management 7 outside of the location 1, an explanation will be provided below.

Figure 3:
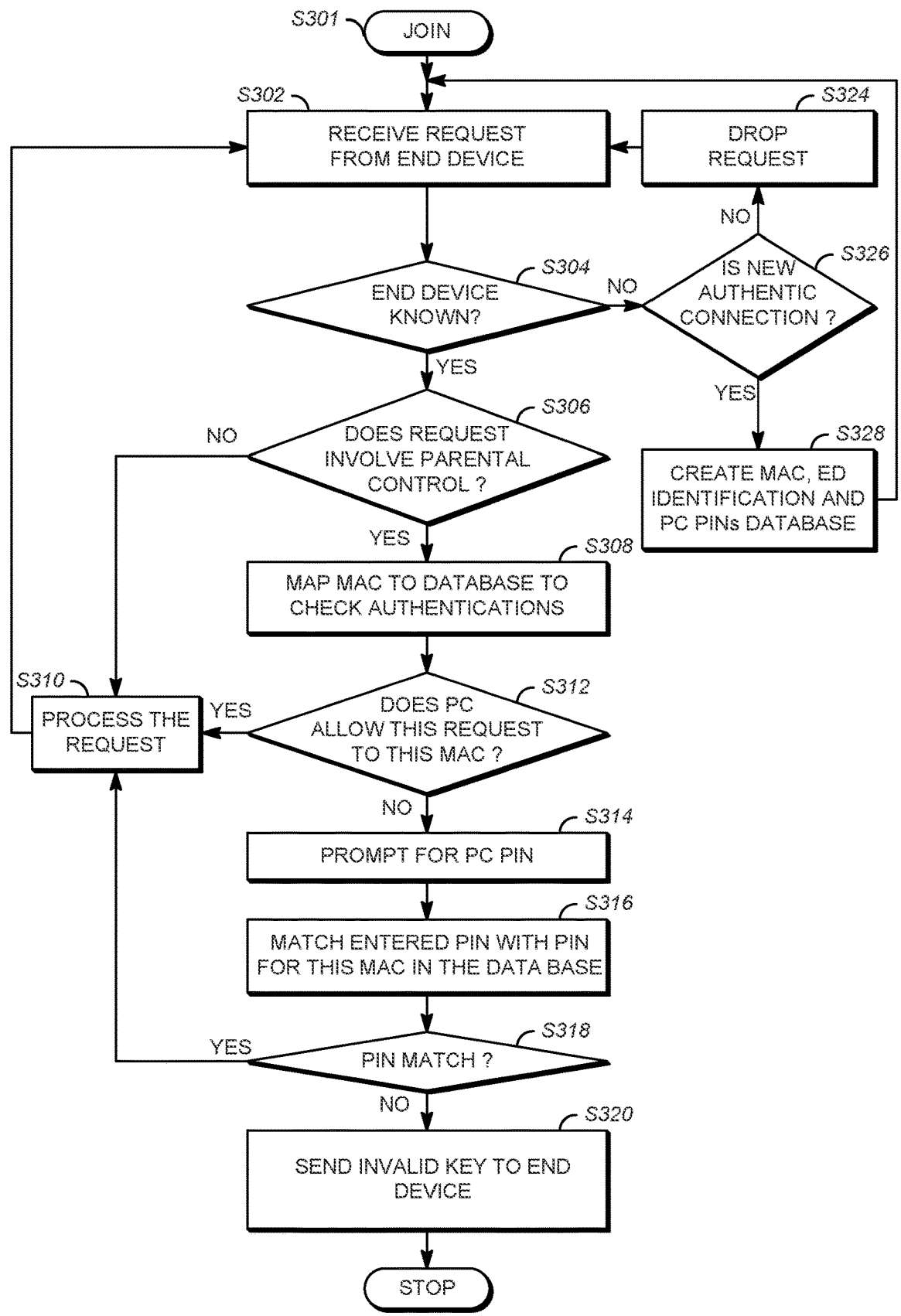
FIG. 3 illustrates a method for detecting wireless home digital interface (WHDI) devices and configuring parental control for each using the system of FIG. 1 according to an embodiment of the present disclosure.

FIG. 3 illustrates a method for detecting WHDI devices and configuring parental control for each, using the system of FIG. 1.

At least one ED 2 is within range of the network connection 8,9 within the location 1. In step S301, the ED 2 then joins the network. Upon joining the network, and when required to access content through the network, the ED 2 can initiate a content access request.

The STB 3 receives the content access request from the ED 2 in step S302 through one of the WHDMIs 6. In step S304, the STB 3 checks if an ED identification of the ED 2 is established and stored within the database of the STB 3. If it is determined that the ED identification has not been established, a determination is then made as to if the ED identification is a new authentic connection in step S326. If the ED identification is a new authentic connection, a new MAC address is then added to the database of the STB 3 in step S328. A new ED identification can then be established for the ED 3 and a new access code/set of pins is created, where each access code/set of pins includes a code or unique pins for each parental category stored. If it is determined that the ED 3 is not an authentic connection, the content access request is dropped in step S324.

If it is determined that the ED identification has been established within the database of the STB 3, a determination is made in step S306 as to whether the content access request from the ED 2 includes parental control restrictions based on information in the STB 3 associated with the ED 2. If parental control restrictions are indicated in the STB 3, the STB 3 maps the MAC address of the ED 2 to the database within the STB in step S308.

The parental control restrictions can allow or disallow the content access request for the MAC address identified and a determination is made in step S312. If it is determined that the parental control restrictions disallow the content access request for the MAC address identified, an access code/set of pins is obtained in step S314. If it is determined that the parental control restrictions allows the content access request for the MAC address identified, the content access request is then processed in step S310, providing content corresponding to the processed content access request.

In step S316, the entered access code/set of pins is matched to the access code/set of pins associated with the MAC address stored with the ED identification in the database.

In step S318, the STB 3 checks to see if the access code/set of pins match to the access code/set of pins associated with the MAC address configured in the database is a positive or negative match. If it is determined that the access code/set of pins match to the access code/set of pins associated with the MAC address stored is positive, the content access request is then processed in step S310, providing content corresponding to the processed content access request.

If there is a negative determination that the access code/set of pins matches the access code/set of pins associated with the MAC address stored in the STB 3, an invalid key is transferred to the ED 2 in step S320.

Figure 4:
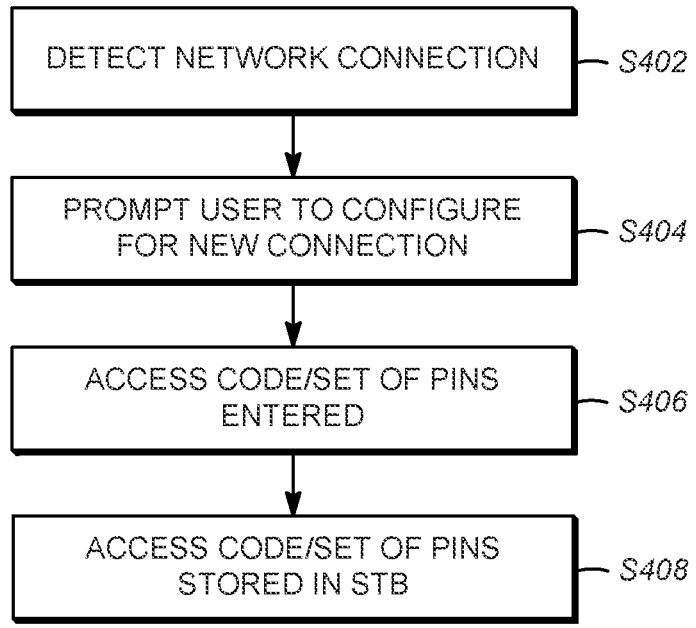
FIG. 4 illustrates a method for detecting wireless home digital interface devices and configuring parental control for each using the system of FIG. 1 according to an embodiment of the present disclosure.

With every initial connection to the network connection 8,9 the STB 3 detects the ED 2 as shown in step S402 in FIG. 4. In step S404, a user or end user is prompted to configure an ED 2 identification and an access code/set of pins. The access code/set of pins is entered in step S406 and then stored in the database 4 of the STB 3 in step S408.

As mentioned above, an access code/set of pins is provided for each ED 2 that is stored in the database 4 of the STB 3. Below in Table 1, a table of an exemplary embodiment of information stored in the STB 3 as access code/set of pins is presented. For each unique MAC address, there can be a specific ED identification and access code/set of pins. The ED identification helps to identify the specific location of the ED 2 of the end user of the ED 2. The ED identification can be something that the user can easily label and categorize. The access code/set of pins includes specific parental controls split into categories. Three separate categories of parental control are shown, however, any number of parental controls can be added to the listing of access code/set of pins, with CategoryX shown as a generic example. In this example, the table includes a category for specific content filters. Typically, this can include limiting access to age inappropriate content. Additionally, there can be limitations as to who can purchase content.

TABLE 1

| ED MAC Address | ED Identification | Access Code/Set of Pins | | |
|---|---|---|---|---|
| | | Content | Purchase | CategoryX |
| Unique Address | MASTER | aaaa | bbbb | cccc |
| Unique Address | Parent's Room | aaaa | bbbb | cccc |
| Unique Address | Child 1 Bd | aaaa | bbbb | 1234 |
| Unique Address | Child 2 Bd | dddd | eeee | ffff |
| Unique Address | Guest Room 1 | ssss | bbbb | cccc |
| Unique Address | Area 1 | xxxx | yyyy | zzzz |
| Unique Address | Area 2 | xxxx | yyyy | zzzz |

Figure 2:
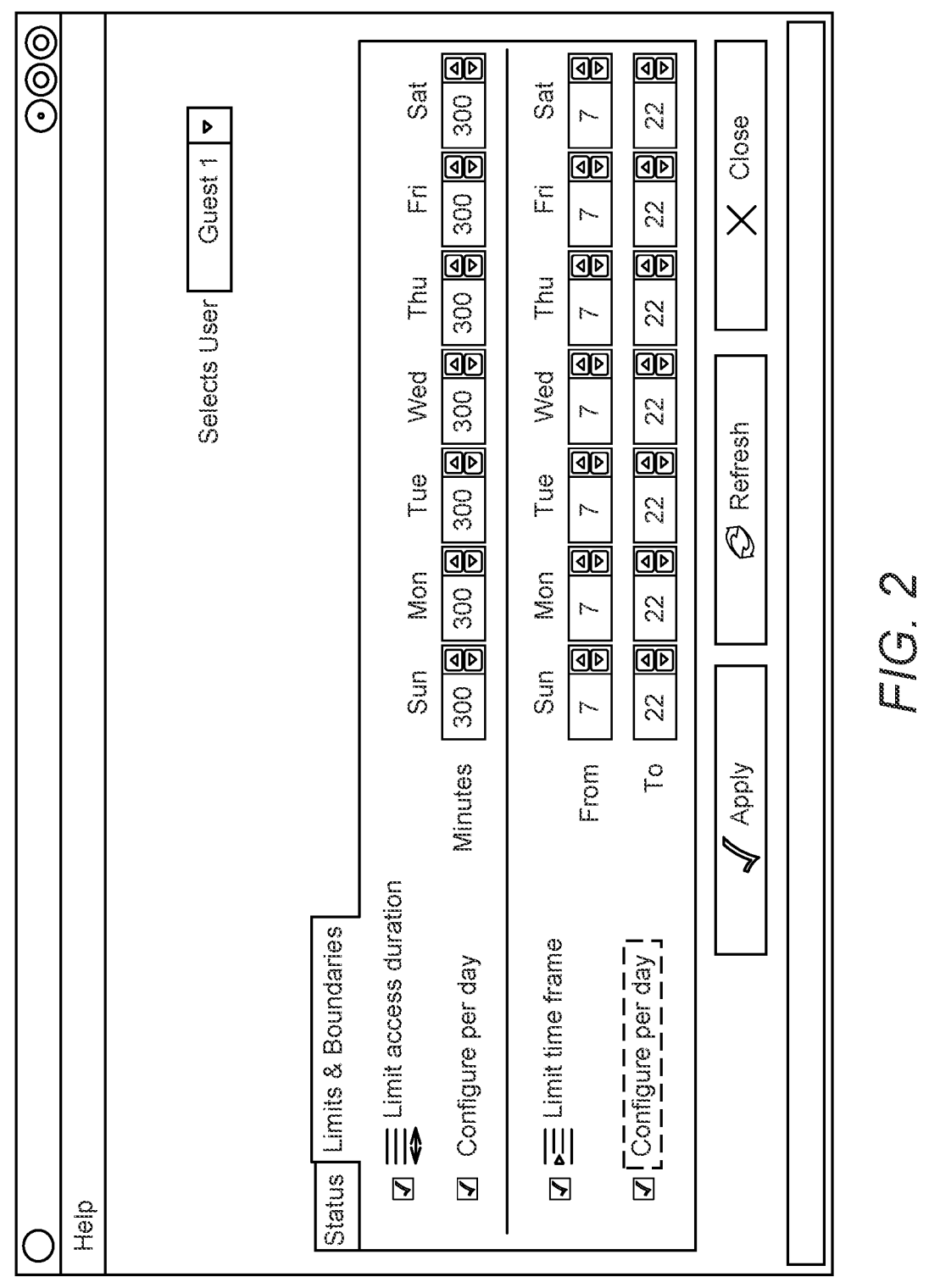

Additional categories that may be found can include, but are not limited to, usage controls, management tools, and monitoring. With usage controls, limits can be set on the STB 3 for issues like duration, timing, and the like. An example of usage controls is illustrated in FIG. 2. The limitations are not limited to what is disclosed in FIG. 2. Management tool can limit usage of certain software, and monitoring can track location and activity of each of the ED 2.

Once the STB 3 detects a handshake or configuration for a new ED 2 on the network connection 8,9 in step S402, the STB will prompt the user to configure the ED identification and access code/set of pins for this new connection in step S404 as illustrated in FIG. 4. The access code/set of pins is entered in step S406. In step S408, the access code/set of pins is stored in the database of the STB 3. A default setting of master or first connection setting can also be used as is shown in Table 1. This information created is used for every ED 2 over the network connection.

Figure 5:
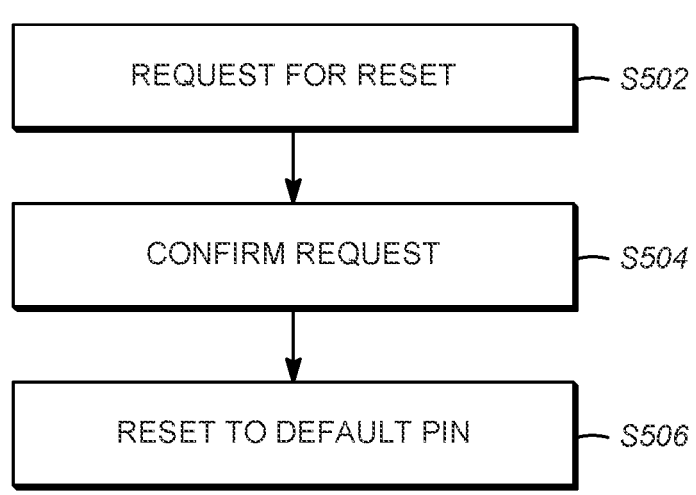
FIG. 5 illustrates a method for resetting parental control for wireless home digital interface devices using the system of FIG. 1 according to an embodiment of the present disclosure.

In the situation where the access code/set of pins is forgotten by the user, the access code/set of pins can be reset as illustrated in FIG. 5. A request for reset of the access code/set of pins is sent by the STB 3 in step S502. In step S504, the request is confirmed through a remote management 7. The access code/set of pins is reset to a default value in step S506. All access code/set of pins can be reset at a time or for a specific ED 2. The remote management 7 can be a multiple system operator (MSO), and the resetting action can update the access code/set of pins to a default access code/set of pins based on a user request. The STB 3 can be reset by a discretionary access control (DAC) of the MSO, such as a MSO HeadEnd DAC as the STB 3 can be registered in DAC. Alternately, the remote management 7 can be other mechanisms such as a TR-069, and the access code/set of pins reset can be through the MAC address or ED identification connected to the STB 3. In this embodiment, the STB 3 can process and act on a TR-069 request. The TR-069 protocol defines an application layer protocol for remote management of equipment connected to an Internet Protocol network.

An example of a location 1 where this method may be processed, is within an environment of a home setting. Some homes have tens of EDs 2 with multiple EDs 2 for each family member or guest that visits the house. In this embodiment, the user sets the access code/set of pins and the end user is a family member or a guest in the house. The WHDI systems can provide parental controls for detected EDs 2 through the STB for all guests and members whenever they choose to join the home's network connection 8, 9 with their EDs 2.

FIG. 7 is a schematic diagram of an exemplary STB 3 according to an embodiment of the present disclosure. It is contemplated by the present disclosure that the STB 3 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 7, the exemplary STB 3 includes one or more memories or memory locations including a main memory 70 as well as an I/O interface 72, a user interface 73, a network interface 74, and one or more processors 75. The main memory 70 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 70 can be used to store any type of instructions associated with algorithms, processes, or operations for controlling the general functions of the STB 3 including the operations of software as well as any operating system such as Linux, UNIX, Windows Server, or other customized and proprietary operating systems. The I/O interface 72 can be an interface for enabling the transfer of information between STB 3 and external devices connected to the ED 2 that need special communication links for interfacing with the one or more processors 75. The I/O interface 72 can be implemented to accommodate various connections to the STB 3 that include, but is not limited to, a universal serial bus (USB) connection, parallel connection, a serial connection, coaxial connection, a High-Definition Multimedia Interface (HDMI) connection, or other known connection in the art connecting to external devices.

The user interface 73 is implemented for allowing communication between a user and the STB 3. The user interface 73 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 74 is a software and/or hardware interface implemented to establish a connection between the STB 3 and Internet connection in the system described in FIG. 1. It is contemplated by the present disclosure that the network interface 74 includes software and/or hardware interface circuitry for establishing communication connections with the rest of the system using both wired and wireless connections for establishing connections to, for example, a local area networks (LANs), wide area networks (WANs), metropolitan area networks (MANs) personal area networks (PANs), and wireless local area networks (WLANs), system area networks (SANs), and other similar networks.

The one or more processors 75 are used for controlling the general operations of the STB 3 Each one or the one or more processors 75 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the STB 3. Communication between the components of the STB 3 (e.g., 70-75) are established using an internal bus 76.

FIG. 8 is a schematic diagram of an exemplary end device (ED) 2 according to an embodiment of the present disclosure. It is contemplated by the present disclosure that the ED 2 include electronic components or electronic computing devices operable to receive, transmit, process, store, and/or manage data and information associated with the systems and methods previously described, which encompasses any suitable processing device adapted to perform computing tasks consistent with the execution of computer-readable instructions stored in memory or computer-readable recording medium.

As shown in FIG. 8, the exemplary ED 2 includes one or more memories or memory locations including a main memory 80 as well as an I/O interface 82, a user interface 83, a network interface 84, and one or more processors 85. The main memory 80 can be a random access memory (RAM), a memory buffer, a hard drive, a database, an erasable programmable read only memory (EPROM), an electrically erasable programmable read only memory (EEPROM), a read only memory (ROM), a flash memory, hard disk or any other various layers of memory hierarchy.

The main memory 80 can be used to store any type of instructions associated with algorithms, processes, or operations for controlling the general functions of the ED 2 including the operations of software as well as any operating system such as Linux, UNIX, Windows Server, or other customized and proprietary operating systems. The I/O interface 82 can be an interface for enabling the transfer of information between ED 2 and external devices connected to the ED 2 that need special communication links for interfacing with the one or more processors 85. The I/O interface 82 can be implemented to accommodate various connections to the ED 2 that include, but are not limited to, a universal serial bus (USB) connection, parallel connection, a serial connection, coaxial connection, a High-Definition Multimedia Interface (HDMI) connection, or other known connection in the art connecting to external devices.

The user interface 83 is implemented for allowing communication between a user and the ED 2. The user interface 83 includes, but is not limited to, a mouse, a keyboard, a liquid crystal display (LCD), cathode ray tube (CRT), thin film transistor (TFT), light-emitting diode (LED), high definition (HD) or other similar display device with touch screen capabilities. The network interface 84 is a software and/or hardware interface implemented to establish a connection between the ED 2 and the STB 3 in the system described in FIG. 1. It is contemplated by the present disclosure that the network interface 84 includes software and/or hardware interface circuitry for establishing communication connections with the rest of the system using both wired and wireless connections for establishing connections to, for example, a local area networks (LANs), wide area networks (WANs), metropolitan area networks (MANs) personal area networks (PANs), and wireless local area networks (WLANs), system area networks (SANs), and other similar networks.

The one or more processors 85 are used for controlling the general operations of the ED 2 Each one or the one or more processors 85 can be, but are not limited to, a central processing unit (CPU), a hardware microprocessor, a multi-core processor, a single core processor, a field programmable gate array (FPGA), an application specific integrated circuit (ASIC), a digital signal processor (DSP), or other similar processing device capable of executing any type of instructions, algorithms, or software for controlling the operation of the ED 2. Communication between the components of the ED 2 (e.g., 80-85) are established using an internal bus 86.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components which perform a part or all of the functions of the secure conditional access architecture.

The present disclosure includes the use of computer programs or algorithms. The programs or algorithms can be stored on a non-transitory computer-readable medium for causing a computer, such as the one or more processors, to execute the steps described in FIGS. 1-6. For example, the one or more memories stores software or algorithms with executable instructions and the one or more processors can execute a set of instructions of the software or algorithms in association with executing generating, processing provisioning requests and provisioning messages, as described in FIGS. 1-6.

The computer programs, which can also be referred to as programs, software, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner.

The subject matter of the present disclosure is provided as examples of apparatus, systems, methods, and programs for performing the features of the secure conditional access architecture. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

Various modifications to the disclosure will be readily apparent to those skilled in the art, and the generic principles defined herein may be applied to other variations without departing from the spirit or scope of the present disclosure. Throughout the present disclosure the terms "example," "examples," or "exemplary" indicate examples or instances and do not imply or require any preference for the noted examples. Thus, the present disclosure is not to be limited to the examples and designs described herein but is to be accorded the widest scope consistent with the principles and novel features disclosed.

We claim:

1. A method of a set-top box (STB) at a location for processing a content access request, the method comprising:
    detecting an end device (ED) within range of a network connection within the location to the STB, wherein the ED is a wireless home digital interface (WHDI) device;
    receiving, from the ED, the content access request for streaming content through a wireless high definition multimedia interface (WHDMI) of a plurality of WHDMIs of the STB;
    checking that an ED identification of the ED is established and stored within a database of the STB, wherein the ED identification identifies a specific location of the ED within the location;
    determining that parental control restrictions are indicated in the STB based on the content access request from the ED, with the ED identification, including the parental control restrictions controlled through the STB based on information in the STB associated with the ED;
    mapping a media access control (MAC) address of the ED to the database within the STB based on the parental control restrictions being indicated;
    determining if the parental control restrictions allow the content access request for the MAC address mapped;
    obtaining an access code or set of pins, when it is determined that parental control restrictions disallow the content access request for the MAC address identified, and matching the access code or set of pins to an access code or set of pins associated with the MAC address stored for the ED identification in the database, wherein the access code or set of pins includes a plurality of parental controls split into a plurality of categories; and
    processing the content access request with a positive determination that the access code or pin obtained is the same access code or pin that is configured in the database of the STB for the ED identification to provide content corresponding to the processed content access request.

2. The method according to claim 1, wherein when the content access request does not include parental control restrictions, the request is processed, providing content corresponding to the processed request.

3. The method according to claim 1, wherein when the parental control restrictions allow request from the ED based on the MAC address in the database, the content access request is processed, providing content corresponding to the processed request.

4. The method according to claim 1, wherein when there is a negative determination that the access code or set of pins obtained is the same access code or set of pins that is configured in the database of the STB, an invalid key is transmitted to the ED.

5. The method according to claim 1, wherein when there is an unsuccessful establishment of the ED identification, determining if the ED is a new authentic connection.

6. The method according to claim 5, wherein when there is an unauthentic connection, the content access request is dropped.

7. The method according to claim 5, wherein when there is new authentic connection, a new MAC address is added to the database of the STB.

8. The method according to claim 7, wherein a new ED identification name is obtained and a new access code or set of pins is obtained, wherein each access code or set of pins includes unique pins for each parental category stored.

9. The method according to claim 8, wherein a default ED identification name and access code or set of pins is set as a default.

10. The method according to claim 1, wherein each ED is uniquely stored within the database in the STB.

11. The method according to claim 1, further comprising at least a second ED, wherein the at least a second ED has a separate identification and access code or set of pins.

12. The method according to claim 1, further comprising resetting the access code or set of pins by a multiple system operator (MSO) to a default access code or set of pins based on a user request, the access code or set of pins reset by a discretionary access control (DAC) of the MSO, the STB being registered in the DAC.

13. The method according to claim 1, wherein all of the access code or set of pins for each ED are reset.

14. The method according to claim 13, wherein the access code or set of pins for a specific ED is reset.

15. The method according to claim 1, wherein the access code or set of pins for a specific ED is reset through a TR-069 protocol request to the STB through the MAC address of the ED or through the ED identification.

16. A non-transitory computer-readable recording medium of a set-top box (STB), the non-transitory computer-readable recording medium storing one or more instructions for processing a content access request, which when executed by the processor perform the method according to claim 1.

17. A system at a location for processing a content access request, the system comprising:
a memory storing one or more computer-readable instructions; and
a processor configured to execute the one or more computer-readable instructions to:
 detect an end device (ED) within range of a network connection within the location to the system;
 receive, from the ED, the content access request for streaming content through a wireless high definition multimedia interface (WHDMI) of a plurality of WHDMIs of the STB;
 check that an ED identification of the ED is established and stored within a database of the system, wherein the ED identification identifies a specific location of the ED within the location;
 determine that parental control restrictions are indicated in the system based on the content access required from the ED with the ED identification, including the parental control restrictions controlled through the system based on information in the STB associated with the ED;
 map a media access control (MAC) address of the ED to the database within the system based on the parental control restrictions being indicated;
 determine if the parental control restrictions allow the content access request for the MAC address mapped;
 obtain an access code or set of pins, when it is determined that parental control restrictions disallow the content access request for the MAC address identified, and matching the access code or set of pins to an access code or set of pins associated with the MAC address stored for the ED identification in the database, wherein the access code or set of pins includes a plurality of parental controls split into a plurality of categories; and
 processing the content access request with a positive determination that the access code or pin obtained is the same access code or pin that is configured in the database of the STB for the ED identification to provide content corresponding to the processed content access request.

\* \* \* \* \*